United States Patent
Clift et al.

(10) Patent No.: US 11,711,568 B2
(45) Date of Patent: Jul. 25, 2023

(54) TECHNIQUES FOR ATSC 3.0 BROADCAST BOUNDARY AREA MANAGEMENT USING PLURAL TUNERS HANDING OFF BETWEEN PRESENTATION AND SCANNING

(71) Applicant: Sony Group Corporation, Tokyo (JP)

(72) Inventors: Graham Clift, Poway, CA (US); Luke Fay, San Diego, CA (US); Brant Candelore, Poway, CA (US); Adam Goldberg, Fairfax, VA (US); Fred Ansfield, San Diego, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/489,675

(22) Filed: Sep. 29, 2021

(65) Prior Publication Data

US 2023/0041462 A1     Feb. 9, 2023

Related U.S. Application Data

(60) Provisional application No. 63/260,017, filed on Aug. 6, 2021, provisional application No. 63/260,090, filed on Aug. 9, 2021.

(51) Int. Cl.
*H04N 21/426* (2011.01)
*H04H 60/19* (2008.01)
(Continued)

(52) U.S. Cl.
CPC ........ *H04N 21/4263* (2013.01); *H04H 60/19* (2013.01); *H04H 60/82* (2013.01); *H04L 65/80* (2013.01); *H04N 21/2665* (2013.01)

(58) Field of Classification Search
CPC .......... H04N 21/4263; H04N 21/2665; H04H 60/19; H04H 60/82; H04L 65/80
See application file for complete search history.

(56) References Cited

U.S. PATENT DOCUMENTS

| 4,169,226 A | 9/1979 | Fukuji |
| 4,804,972 A | 2/1989 | Schudel |

(Continued)

FOREIGN PATENT DOCUMENTS

| CN | 1941868 B | 5/2010 |
| DE | 112011105466 | 7/2021 |

(Continued)

OTHER PUBLICATIONS

"ATSC Standard: A/300:2021, ATSC 3.0 System", Doc. A/300:2021, Jul. 7, 2021.

(Continued)

*Primary Examiner* — Nnenna N Ekpo
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. In a boundary region between first and second broadcast stations in which a receiver can pick up signals from both stations, a primary tuner receiving signals from plural antennae presents a demanded service while a secondary tuner uses a single antenna to scan for duplicate transmissions of the service, with handing off between the tuners being effected between scanning and service presentation.

20 Claims, 8 Drawing Sheets

(51) Int. Cl.
  *H04L 65/80* (2022.01)
  *H04N 21/2665* (2011.01)
  *H04H 60/82* (2008.01)

(56) References Cited

U.S. PATENT DOCUMENTS

| | | | |
|---|---|---|---|
| 5,528,253 | A | 6/1996 | Franklin |
| 6,023,242 | A | 2/2000 | Dixon |
| 6,072,440 | A | 6/2000 | Bowman |
| 6,538,612 | B1 | 3/2003 | King |
| 6,832,070 | B1 | 12/2004 | Perry et al. |
| 6,904,609 | B1 | 6/2005 | Pietraszak et al. |
| 7,075,492 | B1 | 7/2006 | Chen et al. |
| 7,076,202 | B1 | 7/2006 | Billmaier |
| 7,120,404 | B2 | 10/2006 | Gierl |
| 7,194,753 | B1 | 3/2007 | Fries et al. |
| 7,239,274 | B2 | 7/2007 | Lee et al. |
| 7,472,409 | B1 | 12/2008 | Linton |
| 7,685,621 | B2 | 3/2010 | Matsuo |
| 7,865,930 | B2 | 1/2011 | Kim |
| 8,290,492 | B2 | 10/2012 | Lu et al. |
| 8,368,611 | B2 | 2/2013 | King et al. |
| 8,787,237 | B2 | 7/2014 | Väre et al. |
| 9,548,826 | B2 | 1/2017 | Kitazato et al. |
| RE46,304 | E | 2/2017 | Kim et al. |
| 10,904,791 | B2 | 1/2021 | Naik et al. |
| 10,938,511 | B2 | 3/2021 | Kwak et al. |
| 10,939,180 | B2 | 3/2021 | Yang et al. |
| 2003/0051246 | A1 | 3/2003 | Wilder et al. |
| 2003/0214449 | A1 | 11/2003 | King |
| 2004/0128689 | A1 | 7/2004 | Pugel et al. |
| 2004/0227655 | A1 | 11/2004 | King |
| 2005/0108751 | A1 | 5/2005 | DaCosta |
| 2005/0193415 | A1 | 9/2005 | Ikeda |
| 2005/0225495 | A1 | 10/2005 | King |
| 2006/0020978 | A1 | 1/2006 | Miyagawa |
| 2006/0139499 | A1 | 6/2006 | Onomatsu et al. |
| 2006/0184962 | A1 | 8/2006 | Kendall et al. |
| 2006/0187117 | A1 | 8/2006 | Lee et al. |
| 2007/0152897 | A1 | 7/2007 | Zimmerman et al. |
| 2008/0129885 | A1 | 6/2008 | Yi et al. |
| 2008/0186242 | A1 | 8/2008 | Shuster et al. |
| 2008/0186409 | A1 | 8/2008 | Kang et al. |
| 2008/0273497 | A1 | 11/2008 | Lu et al. |
| 2009/0021641 | A1* | 1/2009 | Matsuura ........... H04N 21/4622 348/553 |
| 2009/0135309 | A1 | 5/2009 | DeGeorge et al. |
| 2009/0260038 | A1 | 10/2009 | Acton et al. |
| 2009/0310030 | A1 | 12/2009 | Litwin et al. |
| 2010/0118197 | A1 | 5/2010 | Kim |
| 2010/0214482 | A1 | 8/2010 | Kang |
| 2010/0235858 | A1 | 9/2010 | Muehlbach |
| 2010/0315307 | A1 | 12/2010 | Syed et al. |
| 2011/0126232 | A1 | 5/2011 | Lee et al. |
| 2012/0133840 | A1 | 5/2012 | Shirasuka et al. |
| 2013/0207868 | A1 | 8/2013 | Venghaus et al. |
| 2014/0053215 | A1 | 2/2014 | Murakami et al. |
| 2015/0161236 | A1 | 6/2015 | Beaumont et al. |
| 2015/0161249 | A1 | 6/2015 | Knox et al. |
| 2015/0162897 | A1* | 6/2015 | Zachara ................. H01Q 21/28 455/77 |
| 2015/0189376 | A1* | 7/2015 | Bazata ............. H04N 21/23439 725/114 |
| 2015/0382217 | A1 | 12/2015 | Odio Vivi et al. |
| 2016/0014571 | A1 | 1/2016 | Lee et al. |
| 2016/0173945 | A1 | 6/2016 | Oh et al. |
| 2016/0255394 | A1 | 9/2016 | Yang et al. |
| 2016/0330525 | A1* | 11/2016 | Freeman ................. H04L 67/02 |
| 2017/0064528 | A1 | 3/2017 | Daly et al. |
| 2017/0317408 | A1 | 11/2017 | Hamada et al. |
| 2017/0318353 | A1 | 11/2017 | Petruzzelli et al. |
| 2017/0318502 | A1 | 11/2017 | Singh et al. |
| 2017/0374421 | A1 | 12/2017 | Yim et al. |
| 2018/0048854 | A1 | 2/2018 | Kwak et al. |
| 2018/0120169 | A1 | 5/2018 | Jackson et al. |
| 2018/0139495 | A1 | 5/2018 | Eyer |
| 2018/0359541 | A1 | 12/2018 | Park et al. |
| 2019/0037418 | A1 | 1/2019 | Gunasekara et al. |
| 2019/0079659 | A1 | 3/2019 | Adenwala et al. |
| 2019/0335221 | A1 | 10/2019 | Walker et al. |
| 2019/0373305 | A1 | 12/2019 | Yang et al. |
| 2020/0077125 | A1 | 3/2020 | An et al. |
| 2020/0169775 | A1 | 5/2020 | Clift |
| 2020/0297955 | A1 | 9/2020 | Shouldice |
| 2020/0305003 | A1 | 9/2020 | Landa et al. |
| 2020/0367316 | A1 | 11/2020 | Cili et al. |
| 2022/0256232 | A1 | 8/2022 | Pesin et al. |

FOREIGN PATENT DOCUMENTS

| | | |
|---|---|---|
| EP | 0689307 B1 | 10/2002 |
| EP | 2061166 A2 | 5/2009 |
| EP | 2068470 A2 | 6/2009 |
| EP | 2187530 A4 | 12/2011 |
| EP | 3340636 A4 | 1/2019 |
| JP | 2012049853 A | 3/2012 |
| JP | 5372342 B2 | 12/2013 |
| JP | 2020010249 A | 1/2020 |
| KR | 100824606 B1 | 4/2008 |
| KR | 20080069826 A | 7/2008 |
| KR | 1020080069826 A | 7/2008 |
| KR | 20190139454 A | 12/2019 |
| KR | 20210001101 A | 1/2021 |

OTHER PUBLICATIONS

"ATSC Standard: ATSC 3.0 Interactive Content", Doc. A/344:2021, Mar. 23, 2021.

"ATSC Standard: Physical Layer Protocol", Doc. A/322:2021, Jan. 20, 2021.

"ATSC Standard: Signaling, Delivery, Synchronization, and Error Protection", Doc. A/331:2017, Dec. 6, 2017.

"TRINOVA Boss—Manual", Televes, www.televes.com.

"TV Motion: TriMotion + TriNova Boss", TELEVES, Jul. 2015.

"TVmotion system", TELEVES, retrieved on Sep. 8, 2021 from https://www.televes.com/me/g-006-tvmotion-system.html.

Ahn et al., "ATSC 3.0 for Future Broadcasting: Features and Extensibility", Set International Journal of Broadcast Engineering, 2020 retrieved from https://web.archive.org/web/20201227132053id_/ https://set.org.br/jbe/ed6/Artigo2.pdf.

ATSC Standard: Signaling, Delivery, Synchronization, and Error Protection, Doc. A/331:2021, Jan. 19, 2021.

B. Lee, K. Yang, S. -j. Ra and B. Bae, "Implementation of ATSC 3.0 Service Handoff," 2020 International Conference on Information and Communication Technology Convergence (ICTC), 2020, pp. 1429-1432, doi: 10.1109/ICTC49870.2020.9289581.

Clift et al., "Techniques for ATSC 3.0 Broadcast Boundary Area Management Using Complete Service Reception During Scan to Determine Signal Quality of Frequencies Carrying the Duplicate Service", file history of related U.S. Appl. No. 17/488,258, filed Sep. 28, 2021.

Clift et al., "Techniques for ATSC 3.0 Broadcast Boundary Area Management Using Plural Tuners With Different Numbers of Antennae", file history of related U.S. Appl. No. 17/489,638, filed Sep. 29, 2021.

Clift et al., Techniques for ATSC 3.0 Broadcast Boundary Area Management Using Plural Tuners:, file history of related U.S. Appl. No. 17/488,274, filed Sep. 28, 2021.

Clift et al., "Techniques for ATSC 3.0 Broadcast Boundary Area Management Using Signal Quality and Packet Errors to Differentiate Between Duplicated Services on Different Frequencies During Scan", file history of related U.S. Appl. No. 17/487,753, filed Sep. 28, 2021.

Clift et al., "Techniques for Receiving Non-Real Time (NRT) Data Whilst Traversing a Multi-Frequency Network Boundary", file history of related U.S. Appl. No. 17/489,694, filed Sep. 29, 2021.

Fay et al., "RF Channel Description for Multiple Frequency Networks", file history of related U.S. Appl. No. 17/525,750, filed Nov. 12, 2021.

(56) References Cited

OTHER PUBLICATIONS

Goldberg et al., "ATSC 3 Application Context Switching and Sharing", file history of related U.S. Appl. No. 17/489,708, filed Sep. 29, 2021.

Goldberg et al., "ATSC 3 Reception Across Boundary Conditions Using Location Data", file history of related U.S. Appl. No. 17/489,732, filed Sep. 29, 2021.

S. -I. Park et al., "ATSC 3.0 Transmitter Identification Signals and Applications," in IEEE Transactions on Broadcasting, vol. 63, No. 1, pp. 240-249, Mar. 2017, doi: 10.1109/TBC.2016.2630268.

Y. T. Abdelrahman, R. A. Saeed and A. El-Tahir, "Multiple Physical Layer Pipes performance for DVB-T2,", 2017 International Conference on Communication, Control, Computing and Electronics Engineering (ICCCCEE), 2017, pp. 1-7, doi: 10.1109/ICCCCEE.2017.7867634.

Clift et al., "Techniques for ATSC 3.0 Broadcast Boundary Area Management Using Plural Tuners With Different Numbers of Antennae", related U.S. Appl. No. 17/489,638, Non-Final Office Action dated Jun. 9, 2022.

Clift et al., "Techniques for ATSC 3.0 Broadcast Boundary Area Management Using Plural Tuners With Different Numbers of Antennae", related U.S. Appl. No. 17/489,638, Applicant's response to Non-Final Office Action filed Sep. 8, 2022.

Clift et al., Techniques for ATSC 3.0 Broadcast Boundary Area Management Using Plural Tuners:, related U.S. Appl. No. 17/488,274, Non-Final Office Action dated Jul. 28, 2022.

Clift et al., Techniques for ATSC 3.0 Broadcast Boundary Area Management Using Plural Tuners:, related U.S. Appl. No. 17/488,274, Applicant's response to Non-Final Office Action filed Oct. 10, 2022.

Clift et al., "Techniques for Receiving Non-Real Time (NRT) Data Whilst Traversing a Multi-Frequency Network Boundary", related U.S. Appl. No. 17/489,694, Applicant's response to Non-Final Office Action filed Oct. 10, 2022.

Clift et al., "Techniques for Receiving Non-Real Time (NRT) Data Whilst Traversing a Multi-Frequency Network Boundary", related U.S. Appl. No. 17/489,694, Non-Final Office Action dated Sep. 29, 2022.

Clift et al., "Techniques for ATSC 3.0 Broadcast Boundary Area Management Using Signal Quality and Packet Errors to Differentiate Between Duplicated Services on Different Frequencies During Scan", related U.S. Appl. No. 17/487,753, Non-Final Office Action dated Nov. 16, 2022.

Goldberg et al., "ATSC 3 Reception Across Boundary Conditions Using Location Data", related U.S. Appl. No. 17/489,732 Non-Final Office Action dated Nov. 7, 2022.

Goldberg et al., "ATSC 3 Reception Across Boundary Conditions Using Location Data", related U.S. Appl. No. 17/489,732, Applicant's response to Non-Final Office Action filed Nov. 17, 2022.

"International Search Report", dated Dec. 28, 2022, from the counterpart PCT application PCT/IB22/57333.

\* cited by examiner

TECHNIQUES FOR ATSC 3.0 BROADCAST BOUNDARY AREA MANAGEMENT USING PLURAL TUNERS HANDING OFF BETWEEN PRESENTATION AND SCANNING

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multifrequency network (MFN). Present principles are directed to managing receiver operation in such regions as divulged below.

SUMMARY

Accordingly, in a digital television system having at least one DTV receiver receiving broadcast signals from at least first and second digital television broadcast assemblies, a method includes using a first tuner of a digital television receiver, receiving a demanded service carried by a first broadcast signal;
  presenting the demanded service;
  using a second tuner of the digital television receiver, scanning a frequency spectrum for a duplicate of the demanded service carried by a second broadcast signal; and
  based at least in part on at least a first condition, handing off presentation of the demanded service between the first and second tuners and back again.

The digital television system can include an advanced television systems committee (ATSC) 3.0 system.

In some examples the method includes, based at least in part on at least the first condition, handing off scanning between the first and second tuners and back again. The first condition may include at least one relationship between at least first and second quality metrics associated with the respective demanded service and duplicate of the demanded service. The method may include presenting the demanded service responsive to the second quality metric of the duplicate of the demanded service not exceeding the first quality metric of the demanded service by at least a threshold.

The first tuner can be connected to plural antennae and the second tuner is connected to a single antenna.

The demanded service can be sent on a first broadcast frequency and the duplicate can be sent on a second broadcast frequency, and the method can include tuning the second tuner to the second broadcast frequency. The method may include determining the condition at least in part by comparing information related to the first broadcast frequency to information related to the second broadcast frequency. In examples, the method may also include switching presentation from the first tuner to the second tuner responsive to the comparing information producing a first result and not switching presentation from the first tuner to the second tuner responsive to the comparing information producing a second result.

In another aspect, a digital television system includes at least one receiver configured to receive digital television from a digital television transmitter system. The receiver includes at least one processor programmed with instructions to present a demanded service acquired from a first tuner receiving information from a first broadcast frequency. The instructions are executable to, while presenting the demanded service, use a second tuner to scan for a second broadcast frequency carrying a duplicate of the demanded service. The instructions can be executed to determine respective first and second quality metrics associated with the demanded service and the duplicate of the demanded service, and hand off presentation from the first tuner to the second tuner and back again based on the first and second quality metrics.

In another aspect, a digital television system includes at least one receiver with at least one processor programmed with instructions to configure the processor to receive information from plural digital television broadcast frequencies. The instructions are executable to present a service on the receiver received from a first tuner tuned to a first one of the frequencies, and to scan the frequencies for a duplicate of the service on a second frequency using a second tuner. The instructions further are executable to, responsive to a relationship of a quality metric of the duplicate of the service to a quality metric of the service, present the duplicate of the service from the second tuner in lieu of the service from the first tuner and use the first tuner to scan the frequencies for the second frequency.

The details of the present application, both as to its structure and operation, can best be understood in reference to the accompanying drawings, in which like reference numerals refer to like parts, and in which:

DETAILED DESCRIPTION

Figure 1:
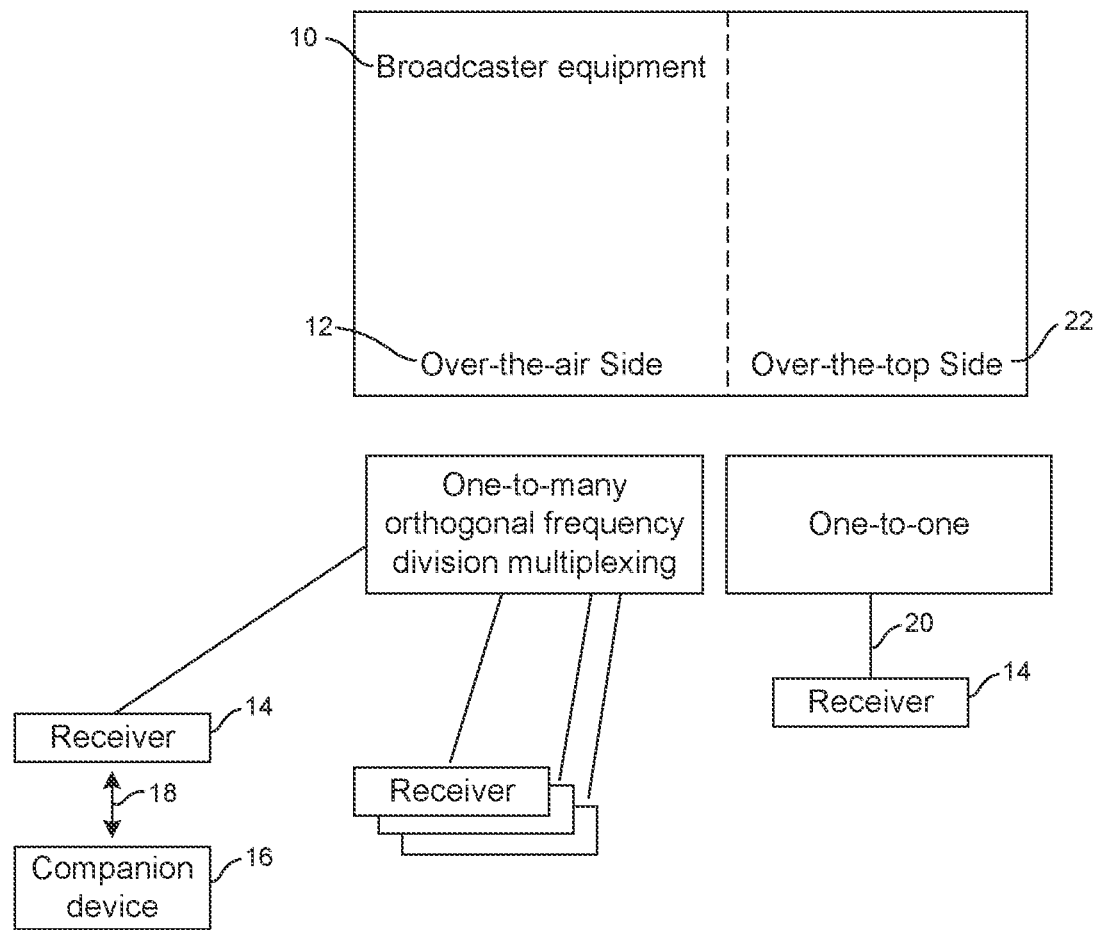
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/331, Annex B, section 13, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"At least one of A, B, and C" (likewise "at least one of A, B, or C" and "at least one of A, B, C") includes A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
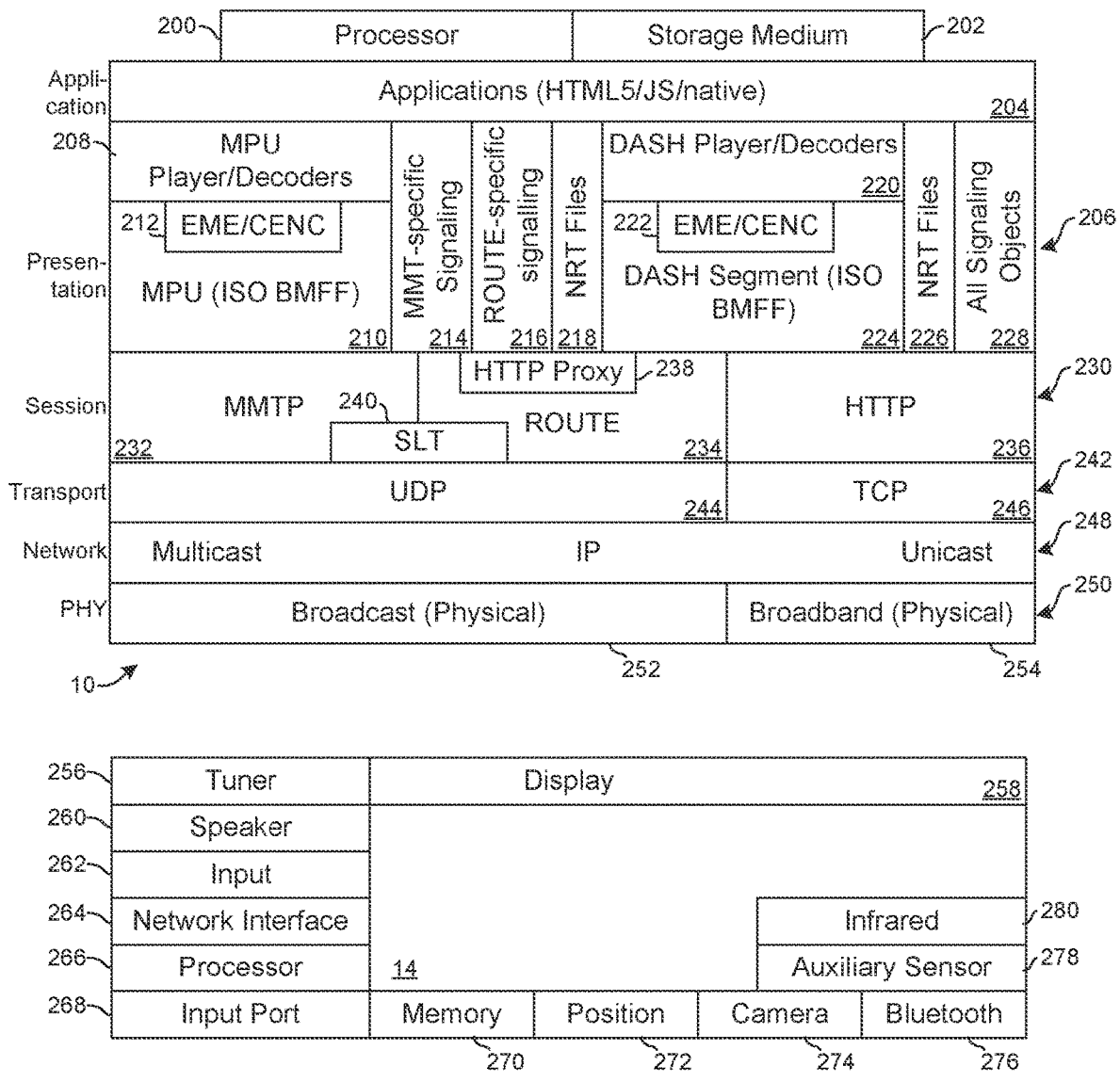
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
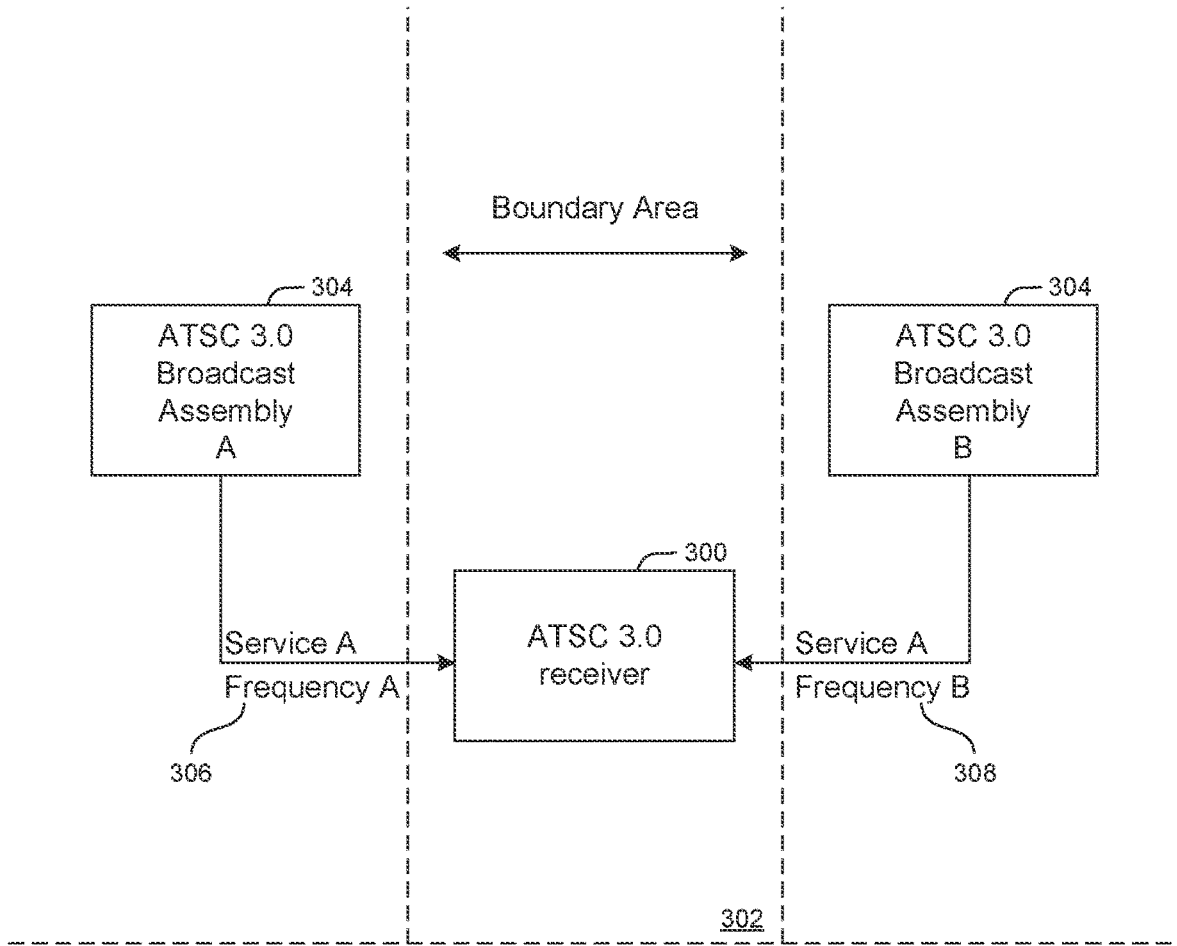
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
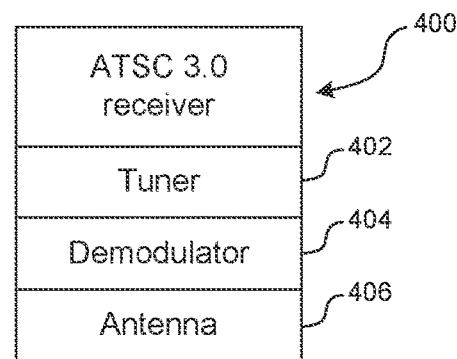
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
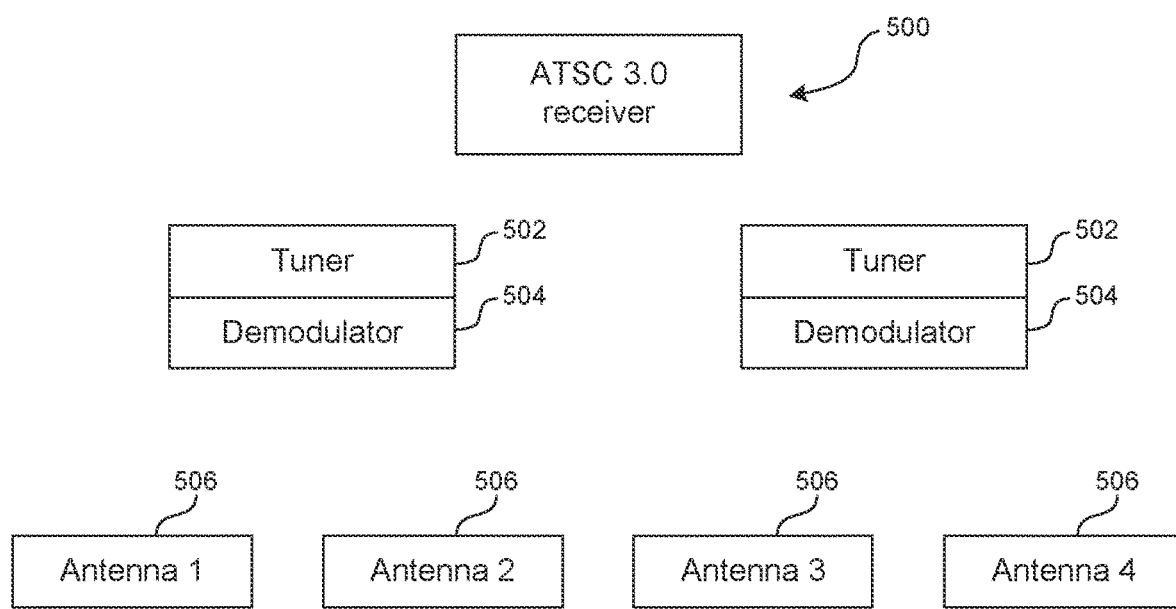
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

Figure 6:
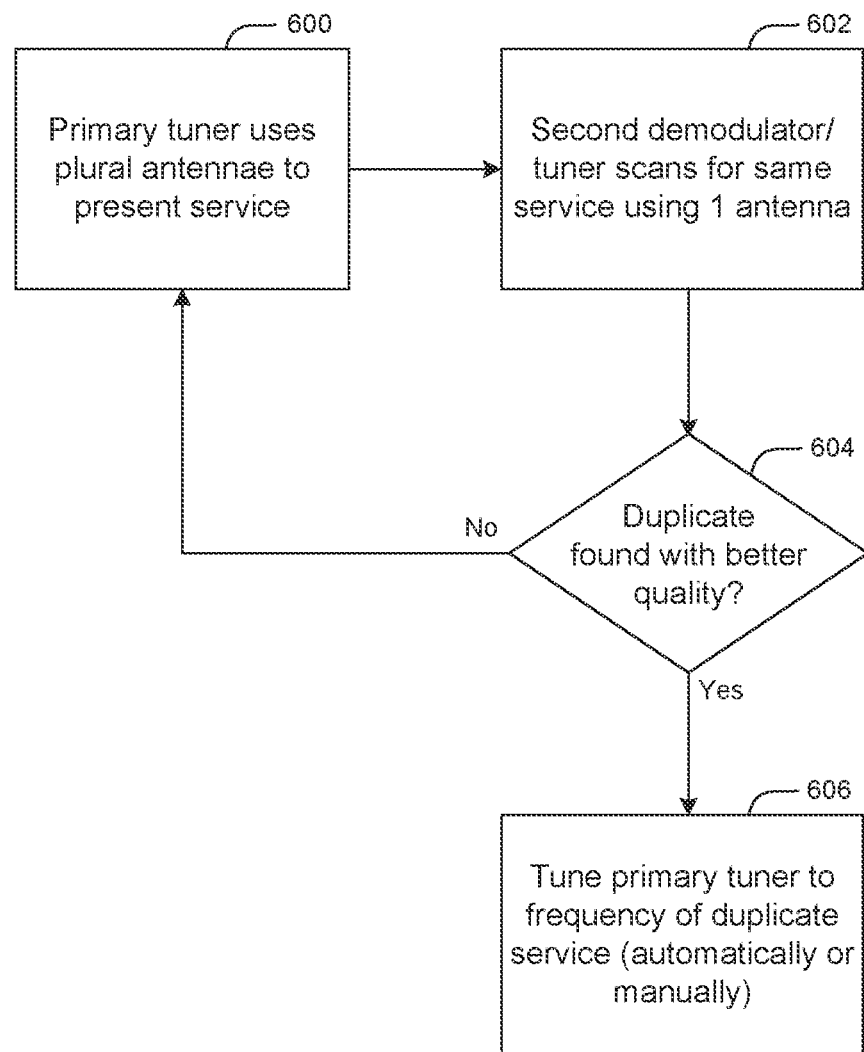
FIG. 6 illustrates example logic in example flow chart format consistent with present principles.
Figure 7:
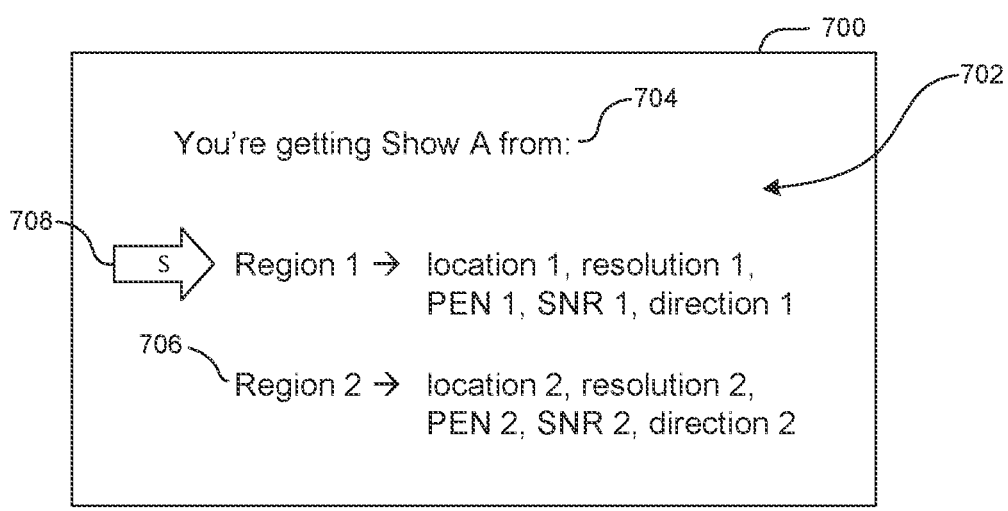
FIG. 7 illustrates an example user interface (UI) consistent with present principles.

FIG. 6 illustrates example logic for using plural tuners, while FIG. 7 illustrates a UI consistent with FIG. 6.

FIG. 6 illustrates example logic for using a single lower level (signaling) physical layer pipe (PLP) to acquire information to optimize frequency tuning in the boundary area 302 in FIG. 3, while FIG. 7 illustrates a UI consistent with FIG. 6. A PLP is a portion of the RF channel which has certain modulation and coding parameters. More specifically, a single ATSC 3.0 broadcast RF channel can contain one or more logical channels, called PLPs, and each PLP can carry one or more audio video services. In addition, a single service can be carried by more than one PLP. A lower level PLP can contain information (lower level signaling or LLS) regarding frequency scans, service identifiers such as broadcast stream identifiers (BSID) and global session identifiers (GSID), and other information. Using the lower level PLP, higher level PLPs carrying AV services and related signaling (such as service layer signaling or SLS) can be identified.

A BSID is tied through a database to a corresponding broadcast frequency on which a service, from the particular broadcaster associated with the BSID, can be received. Thus, a first BSID and related information may indicate that a service can be received from a first broadcaster on a first frequency, and a second BSID and related information may indicate that the same service may be received from a second broadcaster on a second, different frequency than the first frequency.

FIG. 6 illustrates example logic for using plural tuners, while FIG. 7 illustrates a UI consistent with FIG. 6.

Commencing at block 600 in FIG. 6, a digital TV receiver such as any of the ATSC 3.0 receivers described herein (e.g., the ATSC 3.0 receiver 500 shown in FIG. 5) is used to present on its display a broadcast audio video (AV) service output by a first tuner (e.g., 502), which may be regarded as a primary tuner, receiving signals from plural (e.g., three) antennae (e.g., 506) through a first demodulator (e.g., 504). Because the first demodulator receives signals from plural antennae, performance may be optimized using antennae diversity techniques.

At block 602, as the AV service is being played from the primary tuner, a secondary tuner of the receiver can scan the available frequency band using for example the remaining single antenna in FIG. 5. More generally, the secondary tuner scans the band using fewer antennae than the primary tuner in presenting the service. The scan is used to identify a duplicate of the same service being presented through the primary tuner but on a different frequency than the primary tuner is tuned to.

Proceeding to decision diamond 604, it is determined whether any duplicate of the service being presented has been found by the secondary tuner and has better quality than the service being presented through the primary tuner. For example, if the service being presented through the primary tuner is in standard definition and the duplicate is in high definition, it may be determined that the duplicate has better quality than the service being presented through the primary tuner. More generally, if a duplicate of a service has higher resolution than the service currently being presented, it may be determined to have better quality.

Other quality metrics can include, e.g., signal to noise ratio (SNR) and error rate as may be represented by, e.g., packet error number (PEN). In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

Thus, the quality metrics can include resolution, e.g., whether a service is in high definition (HD) or standard definition (SD). The quality metric also can include bit-rate and form-factor, recognizing that not all HD is the same. The quality metrics can include content attributes such as whether a service supports foreign languages, accessibility signaling (e.g. where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

If the duplicate is found not to have a quality exceeding that of the service being presented through the primary tuner by a threshold, the logic may loop back block 600. On the other hand, if the difference in quality metric between the duplicate and the service currently being presented through the primary tuner satisfies the threshold, such as when the SNR of the duplicate service frequency is significantly better than that of the frequency to which the primary tuner is tuned, the logic may move to block 606 to tune the primary tuner to the frequency of the duplicate service. Equivalently, the primary tuner may be switched to a scan mode at block 606 and the secondary tuner used to source the service for display with perhaps one or more antennae being transferred from the primary demodulator to the secondary demodulator if desired.

The above logic may be automatically implemented to select a frequency for a duplicatively broadcast service for the user when, e.g., the user attempts to tune to the service on either frequency, or the logic may be used to recommend a frequency to the user to allow the user to manually tune to that frequency for the desired service.

In this latter regard FIG. 7 illustrates a display 700 such as any of the displays described herein that can be used to present a UI 702 consistent with the logic of FIG. 6. The UI 702 may include a prompt or message 704 that a particular service (or "show" or "program") is being received from two (or more) broadcast regions indicated at 706. A selector 708 may be used by the user to select which region (and hence which frequency) to receive the desired service from.

As shown, each indication 706 may include information about the frequency from that region on which the desired service is carried. This information may include the location of the broadcast station in the region, the resolution (e.g., high definition or standard definition) of the service being received from the region, the PEN of the service being received from the region, the SNR of the service being received from the region, and the direction from the user's present location as indicated by, e.g., global positioning satellite (GPS) to the broadcast station of the region. This latter information may be useful for mobile receivers so that the user may know whether he is traveling toward or away from a particular station.

It is to be understood that while visually perceptive UIs are illustrated herein, the UIs may be perceived by a person visually and/or audibly (e.g., played on speakers), and/or tactilely, e.g., by activating a haptic generator system to generate tactile signals representing the elements of the Us described herein.

Figure 8:
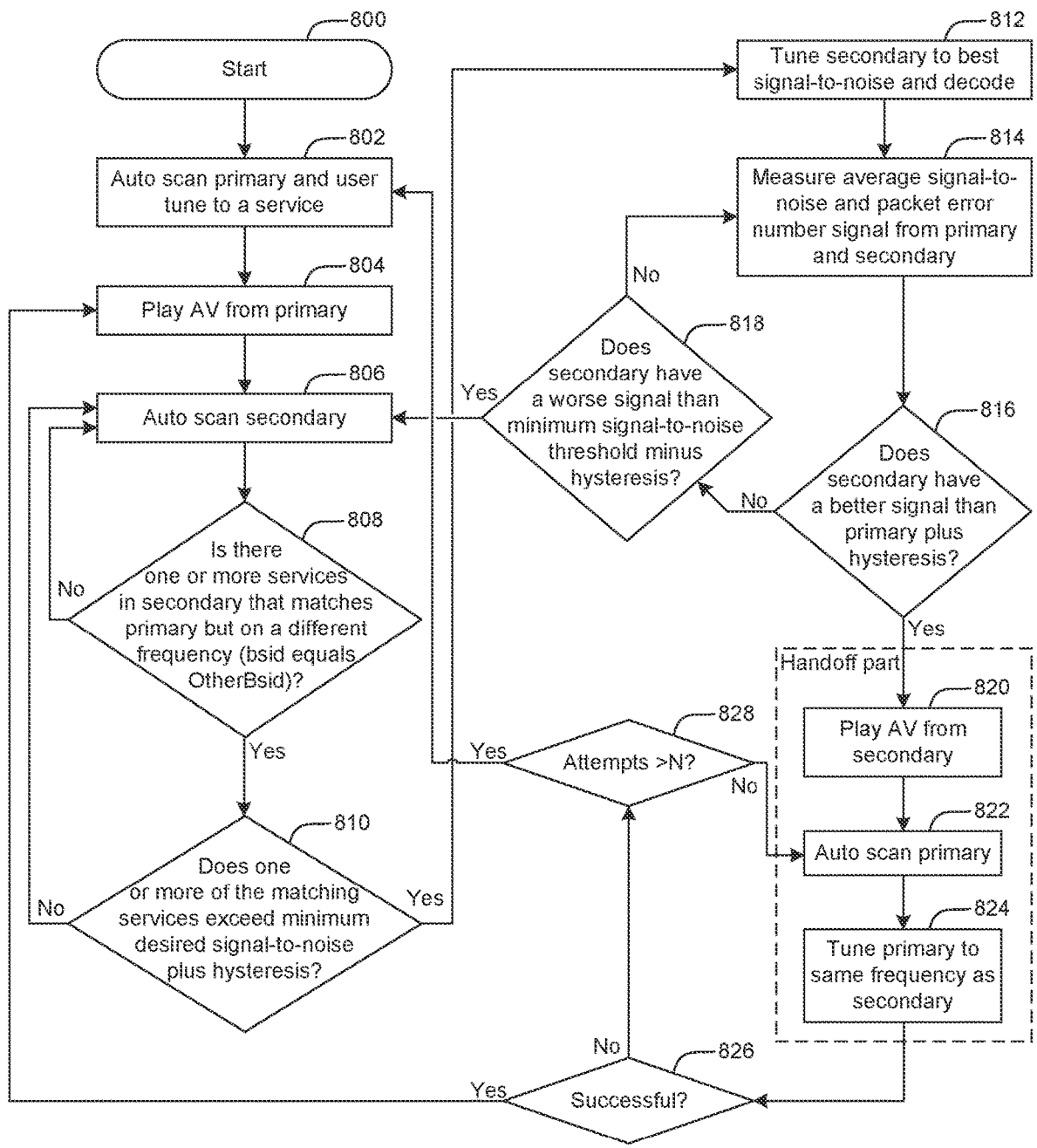
FIG. 8 illustrates example logic in example flow chart format consistent with present principles.
Figure 9:
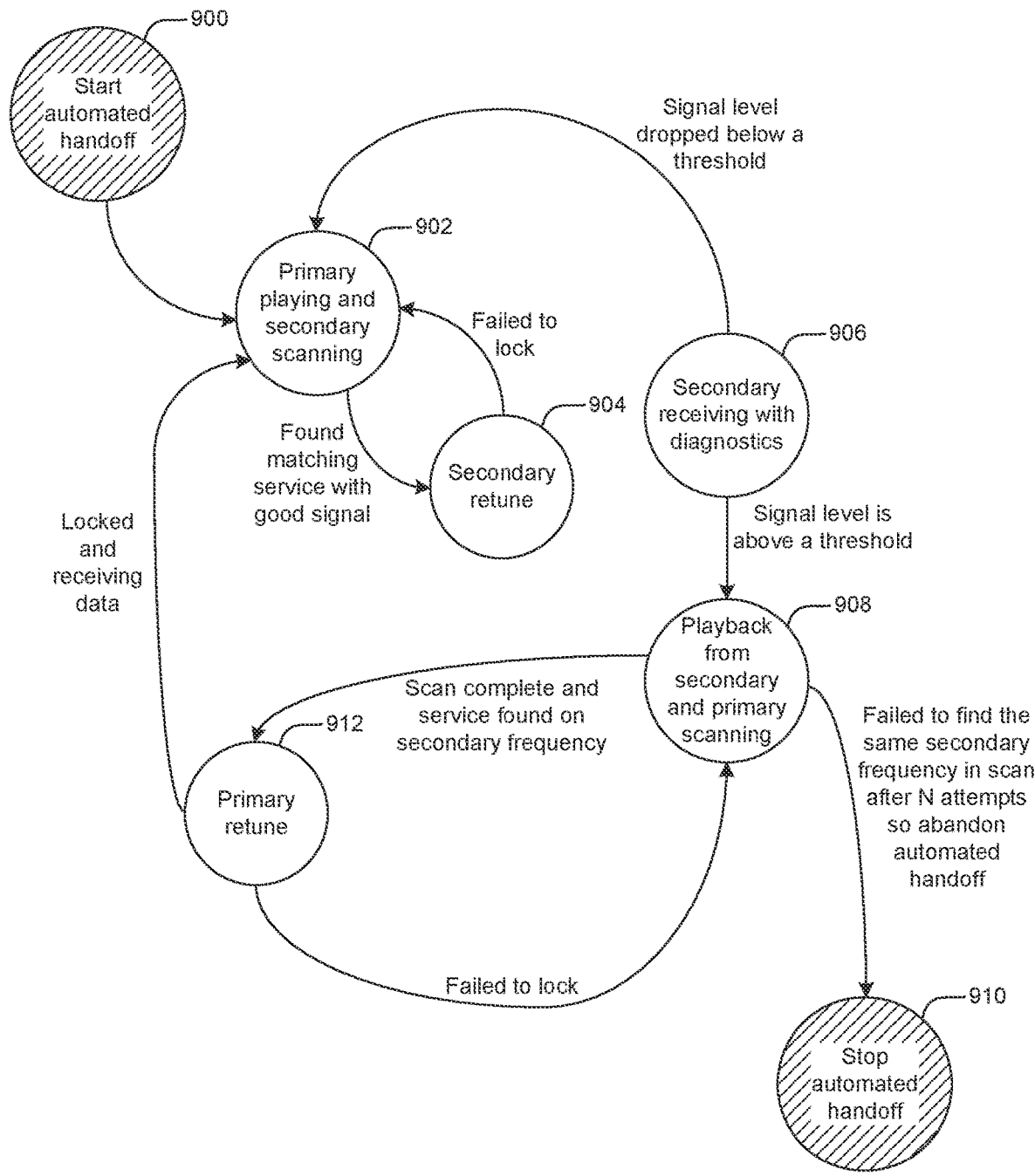
FIG. 9 illustrates example logic in example state format consistent with present principles.

Refer now to FIGS. 8 and 9, which expand on principles herein as illustrated, respectively, in flow chart format and state diagram format. Commencing at block 800 in FIG. 8, the logic moves to block 802 to execute an initial scan with the primary tuner, after which the user may select a service on one of the scanned frequencies for presentation at block 804.

Moving to block 806, the secondary tuner is used to automatically scan the frequency band to identify frequencies carrying a duplicate of the service being presented at block 804. If it is determined at decision diamond 808 that such a duplicate has been located, as indicated by, e.g., using a link mapping table (LMT) acquired by means of information in a lower leveling signaling (LLS) physical layer pipe (PLP) with which the secondary tuner communicates, the logic proceeds to decision diamond 810. Otherwise the logic loops back to block 806 to continue scanning using the secondary tuner.

At decision diamond 810, it is determined whether the identified duplicate service has one or more quality metrics (e.g., resolution and/or SNR and/or PEN) that exceeds the quality metric of the service being presented at block 804 by at least the above-described threshold amount, to provide a measure of hysteresis in switching between tuners and antennae.

If the quality metric of the duplicate does not surpass that of the primary by the required threshold, the logic loops back to block 806 to continue scanning using the secondary tuner. In contrast, responsive to the quality metric of the duplicate surpassing that of the primary by the required threshold, the logic proceeds to block 812 to tune the secondary tuner to the frequency with the best quality metric (e.g., SNR) that carries the demanded service. The service is decoded by the secondary demodulator feeding the secondary tuner and at block 814 the average quality metric(s) from the primary tuner and secondary tuner are determined (measured).

The logic then moves to decision diamond 816 to determine whether the secondary tuner has a better signal as indicated by a comparison of the quality metrics than the primary (satisfying the hysteresis threshold). If not, the logic moves to decision diamond 818 to determine whether the quality metric (e.g., SNR) of the secondary tuner is worse than a minimum threshold minus the hysteresis threshold. If so, the logic loops back to block 806 to continue scanning the frequency band using the secondary tuner. If the quality metric of the secondary is not as bad as the minimum threshold minus the hysteresis threshold, the logic loops back to block 814 to again measure the quality metrics associated with the primary and secondary tuners.

However, responsive to a determination at decision diamond 816 that the quality of the signal associated with the secondary tuner surpasses that associated with the primary tuner by the required threshold, the logic moves to block 820 to switch presentation of the service from the primary tuner to the secondary tuner. As this occurs, the primary tuner is used at block 822 to automatically scan the frequency band. The primary tuner is then tuned to the frequency to which the secondary tuner is tuned at block 824 and if tuning is determined to be successful at decision diamond 826, the logic loops back to block 804 to play the service from the primary tuner and resume scanning at block 806 using the secondary tuner. In this way, the secondary tuner, which may be connected to only a single antenna, is used only briefly to provide the service for display to the user, with the primary tuner, which may be advantageously connected to plural antennae, switching to the better frequency located by the secondary tuner and then resuming sourcing the service for display.

If tuning of the primary tuner to the frequency of the secondary tuner is determined not to be successful at decision diamond 826, the logic moves to decision diamond 828 to determine whether such frequency change has been attempted a threshold number of times. If not, the logic loops back to block 822 to resume scanning using the primary tuner and then to block 824 to tune the primary tuner to the frequency of the secondary tuner. However, if the attempted tuning of the primary tuner has satisfied the threshold number of times the logic ceases attempting to change the frequency to which the primary tuner is tuned and instead loops back to block 802 to resume the process from the beginning.

Turning now to FIG. 9, state 900 represents the start of the above-described automated handoff process between the tuners, in which at state 902 the primary tuner is used to provide the demanded service for display and the secondary tuner is used to scan the frequency band. When a frequency is located by the secondary tuner with a duplicate of the demanded service, the logic arrives at state 904 in which the secondary tuner retunes to the located frequency unless it fails to lock onto the frequency, in which case state 902 is resumed.

When the secondary tuner locks onto the frequency carrying the duplicate of the service, the logic moves to state 906 at which the secondary tuner is used to diagnose the quality metrics. State 902 is resumed responsive to the secondary tuner quality metric dropping below a threshold. In contrast, state 908 is assumed responsive to the quality metric associated with the secondary tuner surpassing the threshold, e.g., surpassing the quality metric associated with the primary tuner by at least a threshold.

In state 908, the duplicate of the service from the secondary tuner is presented on the receiver and the primary tuner is used to scan. If the primary tuner fails to locate the frequency to which the secondary tuner is tuned after a threshold number of attempts, the handoff process is abandoned and state 910 is arrived at in which the process terminates. Otherwise, the logic moves from state 908 to state 912 to tune the primary tuner to the frequency of the secondary tuner and, assuming the primary tuner successfully locks on to the frequency, begin presenting the service once again from the primary tuner at state 902, using the secondary tuner again to scan. In the event that the primary tuner fails to successfully lock on to the frequency in state 912, state 908 is resumed once again to continue playing the service from the secondary tuners with the primary tuner being used for scanning the frequency band.

Note that handoff of service presentation from the secondary tuner to the primary tuner need not necessarily occur, but when the primary tuner is connected to more antennae than the secondary tuner, it makes sense to do so. Note further that the service presentation handoffs may be delayed until a commercial break in the service or scene change in the service.

It will be appreciated that whilst present principals have been described with reference to some example embodiments, these are not intended to be limiting, and that various alternative arrangements may be used to implement the subject matter claimed herein.

What is claimed is:

1. In digital television comprising at least one DTV receiver configured to receive broadcast signals from at least first and second digital television broadcast assemblies, a method, comprising:
   using a first tuner of a digital television receiver, receiving a demanded service carried by a first broadcast signal;
   presenting the demanded service;
   using a second tuner of the digital television receiver, scanning a frequency spectrum for a duplicate of the demanded service carried by a second broadcast signal; and
   based at least in part on at least a first condition, handing off presentation of the demanded service between the first and second tuners, wherein the digital television comprises an advanced television systems committee (ATSC)-3 system.

2. The method of claim 1, comprising based at least in part on at least the first condition, handing off scanning between the first and second tuners and back again.

3. The method of claim 1, wherein the first condition comprises at least one relationship between at least first and second quality metrics associated with the respective demanded service and duplicate of the demanded service.

4. The method of claim 3, comprising presenting the demanded service responsive to the second quality metric of the duplicate of the demanded service not exceeding the first quality metric of the demanded service by at least a threshold.

5. The method of claim 1, wherein the first tuner is connected to plural antennae and the second tuner is connected to a single antenna.

6. The method of claim 1, wherein the demanded service is sent on a first broadcast frequency and the duplicate is sent on a second broadcast frequency, and the method comprises tuning the second tuner to the second broadcast frequency.

7. The method of claim 6, comprising determining the at least one condition at least in part by comparing information related to the first broadcast frequency to information related to the second broadcast frequency.

8. The method of claim 7, comprising switching presentation from the first tuner to the second tuner responsive to the comparing information producing a first result and not switching presentation from the first tuner to the second tuner responsive to the comparing information producing a second result.

9. The method claim 1, wherein the digital television comprises an advanced television systems committee (ATSC) 3.0 system.

10. A digital television apparatus comprising:
    at least one receiver configured to receive digital television from a digital television transmitter system, the receiver comprising:
    at least one processor programmed with instructions to:
    present a demanded service acquired from a first tuner receiving information from a first broadcast frequency;
    while presenting the demanded service, use a second tuner to scan for a second broadcast frequency carrying a duplicate of the demanded service;
    determine respective first and second quality metrics associated with the demanded service and the duplicate of the demanded service; and
    hand off presentation from the first tuner to the second tuner and back again based on the first and second quality metrics, wherein the digital television system comprises an advanced television systems committee (ATSC) 3 system.

11. The digital television apparatus of claim 10, wherein the digital television system comprises an advanced television systems committee (ATSC) 3.0 system.

12. The digital television apparatus of claim 10, wherein the instructions are executable to present the demanded service responsive to the second quality metric of the duplicate of the demanded service not exceeding the first quality metric of the demanded service by at least a threshold.

13. The digital television apparatus of claim 10, wherein the first tuner is connected to plural antennae and the second tuner is connected to a single antenna.

14. The digital television apparatus of claim 10, wherein the instructions are executable to tune the second tuner to the second broadcast frequency.

15. The digital television apparatus of claim 14, wherein the instructions are executable to switch presentation from the first tuner to the second tuner responsive to comparing the first quality metric to the second quality metric producing a first result and not switching presentation from the first tuner to the second tuner responsive to comparing the first quality metric to the second quality metric producing a second result.

16. The digital television apparatus of claim 15, wherein the instructions are executable to continue tuning to the demanded service responsive to the second quality metric of the duplicate of the demanded service not exceeding the first quality metric of the demanded service by at least a threshold.

17. A digital television apparatus comprising:
    at least one receiver comprising at least one processor programmed with instructions to configure the processor to:
    receive plural digital television broadcast frequencies;
    present a service on the receiver received from a first tuner tuned to a first one of the frequencies;
    scan the frequencies for a duplicate of the service on a second frequency using a second tuner; and
    responsive to a relationship of a quality metric of the duplicate of the service to a quality metric of the service, present the duplicate of the service from the second tuner in lieu of the service from the first tuner and use the first tuner to scan the frequencies for the second frequency, wherein the digital television system comprises an advanced television systems committee (ATSC) 3 system.

18. The digital television apparatus of claim 17, wherein the digital television system comprises an advanced television systems committee (ATSC) 3.0 system.

19. The digital television apparatus of claim 17, wherein the instructions are executable to switch presentation from the first tuner to the second tuner responsive to comparing the quality metric of the duplicate of the service to the quality metric of the duplicate producing a first result and not switching presentation from the first tuner to the second tuner responsive to comparing the quality metric of the duplicate of the service to the quality metric of the duplicate producing a second result.

20. The digital television apparatus of claim 19, wherein the instructions are executable to continue presenting the service from the first tuner responsive to the quality metric of the duplicate of the service not exceeding the quality metric of the service by at least a threshold.

\* \* \* \* \*